3,577,371
NITRILOTRIACETIC ACID ALKYD RESINS
Noel D. Blair, Grand Island, N.Y., assignor to Hooker Chemical Corporation, Niagara Falls, N.Y.
No Drawing. Filed Nov. 13, 1967, Ser. No. 682,586
Int. Cl. C08g 17/04, 17/16; C09d 3/64
U.S. Cl. 260—22          12 Claims

ABSTRACT OF THE DISCLOSURE

There are provided: Novel nitrilotriacetic acid alkyd resins and their water soluble ammonium or amine salts having utility as coating compositions on metal.

---

This invention relates to novel alkyd resins, their preparation, and their utility as coating compositions.

More particularly, it relates to the preparation of a novel and unusual series of nitrilotriacetic acid alkyd resins utilizable as coating compositions.

It is an object of this invention to provide novel alkyd resins and processes for preparing them.

Another object of this invention is to provide novel nitrilotriacetic acid alkyd resins.

A further object of this invention is to provide novel nitrilotriacetic acid alkyd resins useful as coating composions.

An additional object of this invention is to provide novel water soluble ammonium or amine salts derived from the nitrilotriacetic acid alkyd resins of this invention, which water soluble alkyd resins are useful as coating compositions.

Another object of this invention is to provide novel and unexpectedly low temperature processes for preparing the nitrilotriacetic acid alkyd resins of this invention useful in preparing colorless alkyd vehicles.

Still an additional object of this invention is to provide novel nitrilotriacetic acid alkyd resins as useful and novel cured coatings on metal.

Still further objects and the scope of the present invention will become apparent from the detailed description given. It should be understood, however, that the detailed description and specific examples, while indicating preferred embodiments of the invention, are given by way of illustration only, since various changes and modifications within this spirit and scope of the invention will become apparent from this description to those skilled in the art.

In accordance with this invention, alkyd resin products of components comprising nitrilotriacetic acid (NTA) and a polyol have been prepared.

Also in accordance with this invention, there can be prepared alkyd resin products of components comprising nitrilotriacetic acid (NTA), (I) 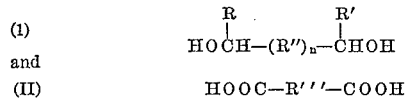
and
(II)          HOOC—R'''—COOH wherein R and R' are independently selected from the group consisting of hydrogen and a 1 to 30 carbon atom alkyl; R'' and R''' are 1 to 30 carbon atom hydrocarbylidene groups, and $n$ is a number from 0 to 3. The acid of Formula II can be replaced by the corresponding diacid chloride or anhydride. Formula II, thus, may be replaced by the corresponding diacid chloride or anhydride for any alkyd of this invention.

Further in accordance with the invention, there are provided alkyd resin products of the foregoing compositions wherein the components (I) and/or (II) are partially supplemented or replaced with polyhydric alcohol of at least three hydroxyl groups and/or hydroxy acid, preferably a polyhydroxy acid.

The stoichiometry involved to effect any desired utilizable composition using the novel compositions and processes of this invention is illustrated or can be inferred from the examples herein.

The hydrocarbylidene and alkyl groups are from 1 to 30 carbon atoms, and preferably of 1 to 12 carbon atoms, and most preferably of 1 to 6 carbon atoms. There carbon chain lengths apply to all carbon-containing groups disclosed herein.

By the term hydrocarbylidene is meant the radical obtained by removal of two hydrogen atoms from a hydrocarbon (alpha, alpha to the alpha, omega type); and thus encompasses the radicals obtained by the removal of one hydrogen atom from an alkyl, alkenyl, aryl, cycloalkyl, cycloalkenyl, alkylaryl and arylalkyl groups.

The term aryl encompasses benzene and naphthalene radicals. The above radicals are more fully described here by definite examples.

Included here are alkyd resins wherein R'' of Formula I and R''' of Formula II are independently selected 1 to 30 carbon atom alkylidene groups; wherein the alkylidene groups are derived from the removal of 1 hydrogen atom from an alkyl group.

Also included are alkyd resins wherein R and R' of Formula I are hydrogen; and R'' of Formula I and R''' of Formula II are independently selected 1 to 30 carbon atom alpha, omega alkylidene groups.

The compositions of this invention also include alkyd resins wherein R'' (I) is an alkeneoxy-methylene substituted alkylidene, the alkene and alkylidene groups having from 1 to 30 carbon atoms. An allyloxy group is a preferred embodiment of the above alkenoxy group.

This invention also includes the foregoing compositions modified by components such as phthalic anhydride and defunctionalized epoxy resin.

This invention also includes an alkyd resin product of components comprising NTA, (I) 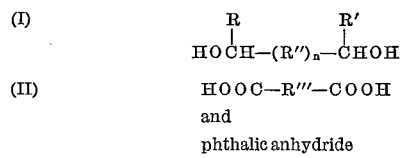

(II)          HOOC—R'''—COOH
and
phthalic anhydride wherein R, R', R'', R''', I, II, and $n$ are as above described.

Other compositions of this invention include alkyd resin products of components comprising NTA, (I) 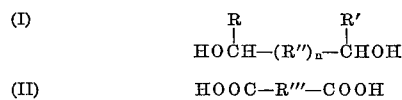

(II)          HOOC—R'''—COOH and a defunctionalized epoxy resin, said defunctionalized epoxy resin being prepared by the reaction of a bisphenol-epichlorohydrin epoxy resin with a fatty acid; wherein R, R', R'', R''', I, II, and $n$ are as above described.

Also included are alkyd resin product of components comprising nitrilotriacetic acid, a drying oil, and a polyol.

The alkyd resins of this invention include water soluble alkyd resin products of components comprising NTA, (I) 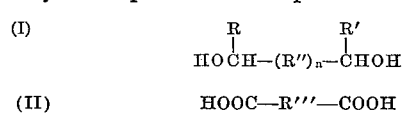

(II)          HOOC—R'''—COOH and an alkaline agent wherein R, R', R'', R''', I, II and $n$ are as above defined; said alkaline agent being a member selected from the group consisting of ammonia, aliphatic amine, and amino aliphatic alcohol.

Also included in this invention are liquid compositions comprising the above described water soluble alkyd resins and sufficient amount of water to dissolve said composition; also included are the vehicles prepared by dissolving the alkyd resins of this invention in sufficient amount of organic solvent to effect the desired non-volatile content.

The invention also embraces the processes for preparing the foregoing compositions of the invention.

The present invention includes the processes for preparing the alkyd resins and water soluble alkyd resins utilizable for coating compositions. Thus a novel process for preparing an alkyd resin comprises mixing and reacting NTA with (I) 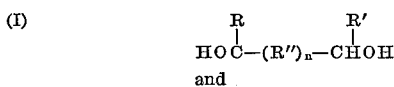

and (II) $\qquad$ HOOC—R'''—COOH wherein R, R', R'', R''', I, II and $n$ are as described above.

nearly colorless nitrilotriacetic acid alkyd resins. Another unusual, novel and unexpected aspect is the formation of nitrilotriacetic alkyd resin coatings which readily cure to utilizable coating compositions on steel having good properties. These NTA coatings have excellent flexibilities, mar resistance, hardness, water resistance, and adhesion on metal. Also fortuitous is the economy involved in the preparation of NTA alkyd resins versus the use of other tricarboxylic acids and similar structures known to the art.

The term "utilizable for coating compositions" refers to an NTA alkyd resin which can be cured to a hard coating (especially on metal). Each NTA alkyd resin has sufficient free carboxyl and hydroxyl groups remaining in the polymer chain after processing, to self-cure thermally by esterification or by cross-linking by common cross-linking agents such as hexamethoxymethyl melamine.

The following Equation III typifies the chemical structure involved in the preparation of NTA alkyd resins.

EQUATION III

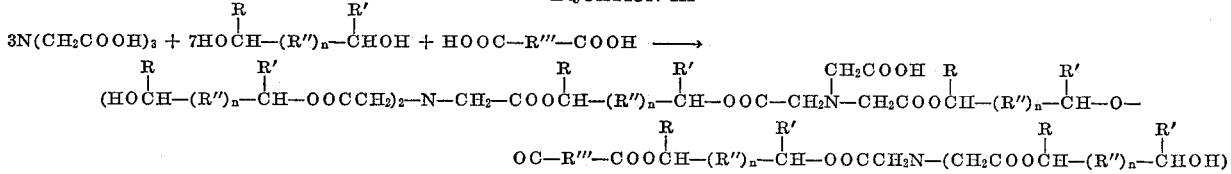

More usually R and R' are hydrogen; and R'' and R''' are independently selected 1 to 30 carbon atom alpha, omega alkylidene groups. Related processes for preparing alkyd resins comprise mixing and reacting NTA with (I), (II) and phthalic anhydride or a defunctionalized epoxy resin, said defunctionalized epoxy resin may be formed by the reaction of a bisphenol-epichlorohydrin epoxy resin with fatty acid.

Related processes for preparing a water soluble alkyd resin comprises mixing and reacting NTA with (I), (II), and an alkaline agent wherein R, R', R'', R''', I, II, $n$ and the alkaline agent are as described above.

In another aspect, this invention includes as an article of manufacture a cured nitrilotriacetic acid alkyd resin coating on metal which comprises the cured reaction product of nitrilotriacetic acid (I) 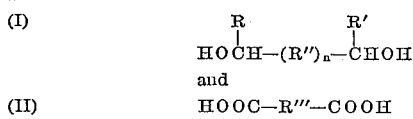

and (II) $\qquad$ HOOC—R'''—COOH formed as a coating on metal; wherein R, R', R'', R''', I, II and $n$ are as described above.

As another novel article of manufacture, a cured nitrilotriacetic acid alkyd resin coating on metal which comprises the cured reaction product of nitriotriacetic acid, (I), (II), and an alkaline agent formed as a coating on metal; wherein R, R', R'', R''', I, II, $n$, and the alkaline agent are as described above.

An important aspect of this invention is the novel and fortuitous use of nitrilotriacetic acid in the formation of alkyd resins utilizable for coating compositions. To those skilled in the art, it is not known to utilize nitrilotriacetic acid in the preparation of alkyd resins for coating compositions. It is unusual, unexpected and novel to utilize nitrilotriacetic acid (a tightly structured tricarboxylic acid containing an amino nitrogen) in the formation of utilizable alkyd resins. To those skilled in the art, because of its amino nitrogen, poor color, poor properties and poor reactivity from nitrilotriacetic acid are to be expected in its reaction to an alkyd resin. An unexpected and novel aspect of this invention is the formation of colorless or the above structure is only one representation of the many possible polymeric structures formed by an NTA/glycol/dibasic acid reaction. The above alkyd is designed to have a 7/1/3 molar ratio of ingredients in the numerical order of glycol, dibasic acid and tribasic acid (NTA). Variations in molar ratio, type of glycol and dibasic acid are of course feasible dependent upon the final cost and properties desired.

The novel processes for the formation of the NTA alkyd resins of this invention can be carried out by either one-step or two-step synthesis. The following synthesis procedure is typical of the two-step process used in this process. A reaction vessel was fitted with a stirrer, nitrogen inlet tube, thermometer, and a steam jacketed partial condenser fitted to a water condenser and water trap. The NTA and glycol were charged initially and pre-esterified at 170–180 degrees centigrade under agitation and an inert nitrogen sparge until a clear homogeneous ester resulted of acid number 30–40. (The acid number can vary from 0 to 100, although values from 20 to 50 are preferred, and values of 30 to 40 are most preferred.) The charge was then cooled to 160 degrees centigrade, a dibasic acid added, and esterification continued until the acid number increased to a desired level, usually 55 (the final acid number may vary from 0 to 100, more preferred are values from 20 through 75, but most preferred are final acid numbers of from 45 to 65).

The above two-step processes are preferred although one-step processes can be utilized in the preparation of an NTA alkyd by mixing NTA into a reaction mixture of dibasic acid and glycol at a temperature of about 175 to 180 degrees centigrade until the acid number has been decreased to about 55.

A nitrogen or inert gas purge or pad is preferably used throughout the reaction.

The one-step and two-step processes described above can be carried out at temperatures of 0–200 degrees centigrade, although temperatures of from 80–180 degrees centigrade are preferred, and temperatures of 160–180 degrees centigrade are most preferred.

The final acid number may vary from 0–100 for both the one or two-step processes described above, although acid numbers from 20–75 are more preferred, but most preferred are final acid numbers from 45–65.

The time necessary to complete the above described one or two-step processes may vary from 1–36 hours, although times of from 3–30 hours are preferred, but most preferred are times of from 4–20 hours.

It is possible to prepare alkyd resins using the above described one or two-step processes with a stoichiometry varying from 100% excess of free carboxyl to 100% excess of free hydroxyl groups, but equivalent stoichiometric proportions of carboxyl and hydroxyl groups are more preferred, although approximately 20%–40% excess hydroxyl are most preferred to minimize gelation. These proportions are also used when a defunctionalized epoxy resin is employed.

A suitable soluble NTA alkyd vehicle may be prepared by heating the above described NTA alkyd resin to a temperature of about 120 degrees centigrade (temperatures of from 0–200 degrees centigrade may be used, although temperatures of from 50–150 degrees centigrade are preferred, most preferred are temperatures of from 100–140 degrees centigrade) and slowly adding this alkyd resin to an organic solvent mixture with stirring until the desired non-volatile content is achieved (a xylol/butanol solvent mixture is often used).

Because the esterification reaction is interrupted at an intermediate acid number during the reaction cycle, an alkaline agent such as ammonia, aliphatic amine, or amino aliphatic alcohol can be reacted with the NTA alkyd to produce a water soluble alkyd resin salt. Thus water soluble alkyd resins can be used to produce water based vehicles for coatings. These coatings, upon application to the substrate, volatilize ammonia, amine or amino aliphatic alcohol, and water leaving behind the high acid alkyd polymer in the applied film. Drying and curing is effected by heat or by completion of the interrupted esterification reaction.

A water soluble NTA alkyd resin vehicle may be prepared by heating the alkyd resin to about 120 degrees centigrade (using the above described temperature limitations) and slowly adding the alkyd resin to a mixture of ammonia or amine solubilizing and reacting agent in water which has been preheated to 60–70 degrees centigrade (temperatures of from 0–100 degrees centigrade may be used although temperatures of from 25–80 degrees centigrade are preferred, most preferred are temperatures of from 60–70 degrees centigrade). Sufficient agitation is used to achieve solubility. Additional alkaline agents can be added to adjust the final pH to about 7–8 (the final pH here may vary from 4 through 10 although a pH of from 6–9 is preferred, most preferred is a final pH of from 7–8).

A melamine modification of the above described water soluble NTA alkyd vehicle may be prepared by simply adding hexamethoxymethyl melamine to the above vehicle.

The reaction time in the above described one of two-step processes may be reduced by the use of a catalytic amount of an acid catalyst, for example p-toluene sulfonic acid catalyst. This acid catalyst may be used in the range of .01–5% by weight of the charge, although .1–2% by weight of the charge is more preferred, most preferred is the use of the acid catalyst in the range of .2 through 1% by weight of the charge. A metal oxide or salt catalyst, such as lead oxide, can be used with the above described charge proportions, although this catalyst is less effective than an acid catalyst.

Coatings of each vehicle were prepared on standard cold rolled steel panels and their properties determined (see Tables III and IV).

The flexibility of each of the above alkyd coatings was measured using a ⅛ inch mandrel. In each case, the coating passed this test indicating excellent flexibility.

Adhesion was determined by one of two methods, either by cross hatch or by knife. The adhesion of all the NTA alkyd coatings was usually good, that is 7–10 using the knife method or 100% passage with a cross hatch test.

Mar resistance was usually good for the NTA alkyd coatings using a simple fingernail scratch test.

Sward hardness test was determined on many of the NTA alkyd coatings and results of these tests show that the coatings were very hard, that is having sward test hardness values of from 53–73.

The utilizable concepts involved here comprise the formation of novel water white alkyd resins using NTA as a trifunctional acid. Both water soluble and conventional organic solvent soluble vehicles can be prepared from these alkyd resins. Cured coatings produced from NTA alkyd resins have excellent flexibility, mar resistance, hardness, adhesion, and utilizable water resistance. NTA alkyd coatings can be cross-linked thermally and/or with melamines which also improved color. The water resistance of these NTA alkyd coatings can also be improved by increasing the heating cycles, higher temperatures, or by use of basic catalysts. The raw material cost of typical NTA alkyd resins are often from 20–50% less than the alkyd resins of the art based upon other trifunctional entities.

The glycols of this novel invention are embraced by formula (I) 

wherein R and R' are independently selected from the group consisting of hydrogen and a 1 to 30 carbon atom alkyl; R" is a 1 to 30 carbon atom hydrocarbylidene group, and $n$ is a number from 0 to 3. More usually, R and R" are hydrogen, and R" is a 1 to 30 carbon atom alpha, omega alkylidene group.

Typical examples of alkylidene type glycols include ethylene glycol, diethylene glycol, triethylene gycol, tetraethylene glycol, propylene glycol, dipropylene glycol, polypropylene glycol, hexylene glycol, 2-methyl-2-ethyl-1,3-propanediol, 2 - ethyl - 1,3-hexanediol, 1,5-pentanediol, thiodiglycol, 1,3-propanediol, 1,3-butanediol, 2,3-butanediol, 1,4-butanediol, 1,3-butylene glycol, neopentyl glycol, like glycols obvious to those skilled in the art, and mixtures thereof.

Other glycols of this invention embraced by Formula I are given by the following structures:

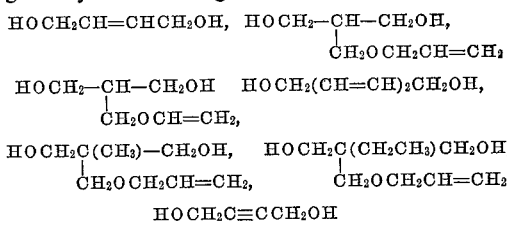

like structures obvious to those skilled in the art, and mixtures thereof.

Other glycols of this invention include cycloalkyl derivatives such as cis-1,2-cyclopentanediol, trans-1,2-cyclopentanediol, 1,2-dimethyl - 1,2 cyclopentanediol, 1,2-cyclohexanediol, trans-1,2-cyclohexanediol, 1,2 - dimethyl-1,2-cyclohexanediol, like compounds obvious to those skilled in the art, and mixtures thereof.

Cycloalkenyl examples can be derived from the above cycloalkyl examples by simple insertion of a double bond.

Aryl examples of the glycols of this invention are given by the formulas below:

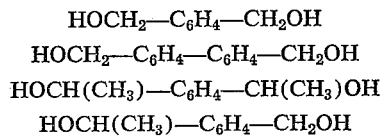

and similar structures obvious to those skilled in the art, and mixtures thereof.

Other examples of alkylaryl and/or arylalkyl glycols are given by the following structures:

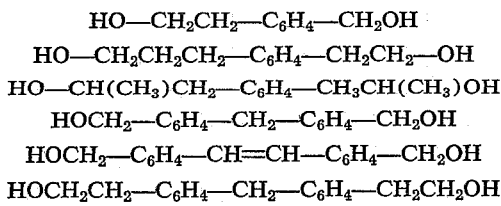

and similar compounds obvious to those skilled in the art, and mixtures thereof.

The dicarboxylic acids of this invention are encompassed by the structures:

(II)          HOOC—R'''—COOH wherein R''' is a 1 to 30 carbon atom hydrocarbylidene group. More restrictedly R''' is a 1 to 30 carbon atom alpha, omega alkylidene group.

Typical examples of suitable dicarboxylic acids include oxalic acid, malonic acid, succinic acid, glutaric acid, adipic acid, pimelic acid, suberic acid, azelaic acid, sebacic acid, maleic acid, fumaric acid, phthalic acid, isophthalic acid, terephthalic acid, similar dicarboxylic acids obvious to those skilled in the art, and mixtures thereof.

Other typical examples of dicarboxylic acids of this invention include the structures:

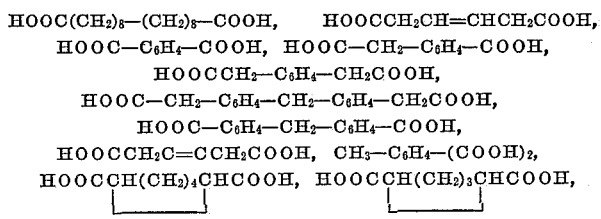

and other dicarboxylic acids obvious to those skilled in the art, and mixtures thereof.

The alkaline agents used to form the ammonium or amine salts of the NTA alkyd resins of this invention are selected from the group consisting of ammonia, aliphatic amine, and amino aliphatic alcohol.

Typical examples of suitable amines include methylamine, dimethylamine, trimethylamine, ethylamine, diethylamine, triethylamine, dipropylamine, isopropylamine, allylamine, diallylamine, dibutylamine, isobutylamine, sec - butylamine, t - butylamine, amylamine, cyclohexylamine, dicyclohexylamine, 2-aminoheptane, 2-amino-4-methylhexane, decylamine, dioctylamine, trioctadecylamine, tallow amine, other similar amines obvious to those skilled in the art, and mixtures thereof.

Typical examples of suitable amino aliphatic alcohols include dimethyl-aminoethanol, monoethanolamine, diethanolamine, triethanolamine, methylethanolamine, methyldiethanolamine, dimethylethanolamine, diethylethanolamine, dibutylethanolamine, butylethanolamine, diisopropylethanolamine, aminoethylethanolamine, di(2-ethylhexyl)ethanolamine, ethyldiethanolamine, N - acetylethanolamine, phenylethanolamine, phenyldiethanolamine, phenylethylethanolamine, monoisopropanolamine, diisopropanolamine, triisopropanolamine, dibutylisopropanolamine, dimethylisopropanolamine, N - (2 - hydroxypropyl)-ethylenediamine, other similar amino aliphatic alcohols obvious to those skilled in the art, and mixtures thereof. These compounds generally contain 1 to 3 alkanol groups and 2 to 3 hydrocarbyl groups.

Typical examples of suitable organic solvents used in this invention include alcohols, such as methanol, ethanol, isopropanol and butanol, alkanes, such as hexane and octane, aromatics such as benzene, xylene and toluene and similar solvents obvious to those skilled in the art, and mixtures thereof.

The fatty acids of this invention include the fatty acids derived from lipids, fats, oils and esters of fatty acids with glycerol. Typical examples of suitable oils include, in addition to coconut oil, babassu oil, palm kernel oil, palm oil, olive oil, castor oil, peanut oil, rapp oil, beef tallow, lard, whale blubber, similar compositions, obvious to those skilled in the art, and mixtures thereof.

Typical examples of suitable drying oils include, in addition to linseed oil, cotton seed oil, corn oil, soybean oil, oiticia oil, tung oil, perilla oil, similar oils obvious to those skilled in the art, and mixtures thereof.

In addition to the above-described glycols, typical examples of suitable polyols include triols such as glycerol, trimethylolpropane, trimethylolethane, 1,2,4 - butanetriol, and 1,2,6-hexanetriol. Other examples of suitable polyols include pentaerythritol, dipentaerythritol, tripentaerythritol, anhydroenneaheptitol, mannitol, sorbitol, methyl glucoside and similar compounds obvious to those skilled in the art, and mixtures thereof. Generally the polyhydric alcohols have 2 to 6 hydroxyl groups.

Typical examples of suitable hydroxy-acids include alpha-hydroxy-decanoic acid, glycolic acid, lactic acid, alpha-hydroxybutyric acid, alpha-hydroxyvaleric acid, hydroxy acrylic acid, beta-hydroxybutyric acid, beta-hydroxy valeric acid, gamma-hydroxybutyric acid, gamma-hydroxy valeric acid, delta-hydroxy valeric acid, sabinic acid, juniperic acid, jalapinolic acid, glyceric acid, 3,12-dihydroxy palitic acid, trihydroxy butyric acid, aleuritic acid, satiuic acid, beta-hydroxy acrylic acid, ricinolpic acid, vernolic acid, ambrettolic acid, similar compositions obvious to those skilled in the art, and mixtures thereof.

Typical examples of suitable acid catalyst include para-toluene sulfonic acid, methanesulfonic acid, hexanesulfonic acid, benzenesulfonic acid, 4-chlorobenzene sulfonic acid, chlorosulfonic acid, 2-naphthalenemethanesulfonic acid, 1,6-naphthalenesulfonic acid, phosphoric acid, boron trifluoride, similar compositions obvious to those skilled in the art, and mixtures thereof.

Typical examples of suitable metal oxide or metal salt catalysts include lead oxide, antimony oxide, stannic chloride, silver oxide, other oxides and salts of the metallic groups of the Periodic Table, similar compositions obvious to those skilled in the art, and mixtures thereof.

Another novel, unique and unexpected aspect of this invention is the residual chelating power of the NTA type alkyd resins utilized as a coating on metals such as steel, ferrous materials, copper, aluminum, zinc and other metals obvious to those skilled in the art. This property effects a stronger, more tenacious, and more utilizable coating of the NTA alkyd resin on the given metal. Thus a novel article of manufacture comprises a cured nitrilotriacetic acid alkyd resin or its ammonium or amine salt coating on metal.

The NTA alkyd resin coatings may also be differentiated, in addition to other means, from tricarboxylic acids known to the art by the residual chelating power resident in the NTA radical present in the novel NTA alkyd resins of this invention.

The following examples are presented to described the invention more fully without any intent of being limited thereby. All parts and percentages are by weight, and all temperatures are in degrees centigrade unless otherwise specified.

EXAMPLE 1

This example describes the preparation of a two step alkyd resin using a 7 mole glycol, 1 mole adipic acid, and 3 mole NTA stoichiometry. The NTA (573 parts) was charged into a reaction vessel of neopentyl glycol (728 parts). This NTA, glycol mixture was pre-esterified at 170–180 degrees centigrade with stirring under an inert gas atmosphere. After a period of about 4–8 hours a clear homogeneous ester resulted with an acid number of approximately 30–36. The charge was then cooled to 160 degrees centigrade, adipic acid (146 parts) was added, and the esterification was continued at 160 degrees centigrade until the acid number had increased to a level of about 55 (giving a total process time of about 18 hours).

Infrared analyses confirmed the structure of the resulting alkyd.

EXAMPLE 2

This example describes the preparation of a one step alkyd having a 7 mole propylene glycol, 1 mole adipic acid, and 3 mole NTA stoichiometry. This alkyd was prepared by mixing NTA (344 parts) into a mixture of adipic acid (88 parts) and propylene glycol (564 parts) for 32 hours at a temperature of about 175–180 degrees centigrade until the acid number had been decreased to about 35.

EXAMPLE 3

The two-step process of Example 1 was repeated using a 7 mole glycol, 1 mole adipic acid, 3 mole NTA stoichiometry (631 parts of 1,3-butylene glycol, 146 parts of adipic acid, and 573 parts of NTA) to produce the corresponding alkyd in about 12 hours process time with an acid number of 55.

EXAMPLE 4

The one-step process of Example 2 was repeated to produce an alkyd having a 7 mole glycol, 1 mole adipic acid, and 3 mole NTA stoichiometry (propylene glycol, 533 parts, adipic acid, 146 parts, and NTA, 573 parts) using a process time of about 17 hours and effecting a final acid number of about 55.

EXAMPLE 5

The one-step process of Example 2 was repeated to produce an alkyd having a 7 mole glycol, 1 mole adipic acid, and 3 mole NTA stoichiometry (ethylene glycol, 435 parts, adipic acid, 146 parts, and NTA, 573 parts) using a process time of about 12 hours and effecting an acid number of about 55.

EXAMPLE 6

The two-step process of Example 1 was repeated to produce an alkyd having a 7 mole glycol, 1.5 mole adipic acid, 1 mole phthalic anhydride, and 2 mole NTA stoichiometry (neopentyl glycol, 728 parts; adipic acid, 219 parts; phthalic anhydride, 148 parts; and NTA, 382 parts) using a process time of about 18 hours and effecting a final acid number of about 55.

EXAMPLE 7

The two-step process of Example 1 was repeated to produce an alkyd having an 8.2 mole glycol, 2 mole adipic acid, and 3 mole NTA stoichiometry (neopentyl glycol, 853 parts; adipic acid, 292 parts; and NTA, 573 parts) using a process time of about 20 hours and effecting an acid number of about 55.

EXAMPLE 8

The two-step process of Example 1 was repeated to produce an alkyd having an 8.2 mole glycol, 2 mole adipic acid, and 3 mole NTA stoichiometry (neopentyl glycol, 853 parts; adipic acid, 292 parts; and NTA, 573 parts) using a process time of about 8 hours and effecting a final acid number of 55. The shorter process time here was effected by including 0.5% of the weight of the charge in p-toluene sulfonic acid (a catalyst).

EXAMPLE 9

The two-step process of Example 1 was repeated using an 8.2 mole glycol, 2 adipic acid, and 3 mole NTA stoichiometry (neopentyl glycol, 853 parts, adipic acid, 292 parts, and NTA, 573 parts) using a process time of about 22 hours and effecting a final acid number of about 55. In this case a lead oxide catalyst of about 0.5% by weight of the total charge was used also.

EXAMPLE 10

The two-step process of Example 1 was repeated to produce an alkyd having a 8.2 mole glycol, 2 mole adipic acid, and 3 mole NTA stoichiometry (neopentyl glycol, 853 parts; adipic acid, 292 parts; and NTA, 573 parts) using a process time of about 16 and effecting a final acid number of about 55. In this case a lead oxide catalyst of about 1.0% by weight of the total charge was used.

EXAMPLE 11

The two-step process of Example 1 was repeated to produce an alkyd having a 7.7 mole glycol, 0.5 mole defunctionalized epoxy resin, 2 mole adipic acid, and 3 mole NTA stoichiometry (neopentyl glycol, 561 parts, defunctionalized epoxy resin, 603 parts; adipic acid, 205 parts; and NTA, 401 parts) using a process time of about 27 hours and effecting an acid number of about 55. The defunctionalized epoxy resin of acid number 6.6 and functionality of about 2 was prepared by the previous reaction of 1 mole of a bisphenol A epichlorohydrin epoxy resin (of about 500 equivalents epoxy per mole) with 4 moles of a coconut fatty acid.

EXAMPLE 12

A long oil modified NTA linseed alkyd was prepared by mixing linseed oil (70.4 parts) and glycerine (9.2 parts) with stirring at 205 degrees centigrade under a nitrogen sparge. Lead oxide catalyst (0.0149 part) was added, and the reaction was held at 205 degrees centigrade for 2½ hours until the alcoholysis was complete. NTA (14.1 parts) was then added, and the reaction temperature increased to 230 degrees centigrade. After 15 hours, the reaction mixture was filtered, and the resulting NTA alkyd linseed oil had an acid number of 1.9 and a Gardner viscosity of S. Standard steel panels were dipped into this alkyd and baked for 15 minutes at 205 degrees centigrade. Excellent films were obtained in the 0.2–0.3 mil range.

In processes involving drying oils, generally higher esterification temperatures of about 160 to 250 degrees centigrade are employed. Other conditions, proportions, and the like are the same as described herein.

EXAMPLES 13–20 (PART A)

Water soluble NTA alkyd vehicle preparation

In these examples, the NTA alkyd resin was heated to 120 degrees centigrade and slowly added to a mixture of amine solubilizing agent in water which was preheated to 60–70 degrees centigrade. Sufficient agitation was used to achieve solubility, and additional amine was added to adjust the pH to 7–8. Melamine modification was made by adding hexamethoxymethyl melamine to the above vehicle. The specific components, proportions, and the properties of the vehicles are shown in Table I.

EXAMPLES 21–25 (PART A)

Solvent soluble NTA alkyd preparation

In these examples, the NTA alkyd resin was heated to 120 degrees centigrade and slowly added to a xylol/butanol solvent mixture with stirring until the desired nonvolatile content was achieved. The components, proportions and properties of the vehicles are shown in Table II.

EXAMPLES 13–25 (PART B)

Prepration of NTA alkyd coatings on steel

The NTA alkyd resin vehicles of Examples 13–25 were applied to 3 inch x 5 inch steel panels and air flashed at room temperature for 15 minutes. The panels were then cured, and the coatings had the properties as indicated on Tables III and IV. Hard, utilizable coatings were obtained in all cases.

EXAMPLE 26

NTA (300 parts) and glycerol (420 parts) were heated at about 175 degrees centigrade for 3 hours using a nitrogen purge to an acid number of about 80. A clear, light, highly viscous NTA alkyd was isolated which was water soluble.

TABLE I.—COMPOSITION AND PROPERTIES OF WATER SOLUBLE NTA ALKYD VEHICLES

| | Example | | | | | | | |
|---|---|---|---|---|---|---|---|---|
| | 13A | 14A | 15A | 16A | 17A | 18A | 19A | 20A |
| Composition of alkyd of example | 1 | 1 | 2 | 5 | 4 | 3 | 7 | 7 |
| Alkyd, parts | 400 | 180 | 160 | 160 | 160 | 171 | 100 | 70 |
| Water, parts | 556.4 | 250.4 | 79 | 92.9 | 92.9 | 92.9 | 980.2 | 985.8 |
| t-Butanol, parts | | | 13.9 | | | | | |
| Dimethyl-amino ethanol, parts | 44.6 | 20.1 | 8.0 | 16.0 | 15.6 | 13.8 | | |
| Ammonium hydroxide, parts | | | | | | | 19.8 | 14.2 |
| Hexamethoxymethyl melamine, parts | | 36.0 | | | | | | 30 |
| Color, Gardner | 2 | 2 | <1 | <1 | <1 | 1 | <1 | <1 |
| Viscosity, Gardner | X-Y | W-X | U | R | H | V-W | <A | <A |
| Appearance | (1) | (1) | Clear | Clear | (1) | Clear | (1) | (1) |
| Non volatile, percent | 40.7 | 44.9 | 46.0 | 59.8 | 52.7 | 54.3 | 10.0 | 10.0 |
| Weight/gallon | 8.92 | 8.98 | 8.96 | 9.97 | 9.48 | 9.29 | | |
| pH | 7.8 | 7.2 | 7.1 | 7.2 | 6.7 | 7.4 | 8.1 | 8.1 |

[1] Slight haze.

TABLE II.—COMPOSITION AND PROPERTIES OF SOLVENT SOLUBLE NTA ALKYD VEHICLES

| | Example | | | | |
|---|---|---|---|---|---|
| | 21A | 22A | 23A | 24A | 25A |
| Composition of alkyd of Example | 1 | 7 | 6 | 11 | 7 |
| Alkyd, parts | 180 | 180 | 180 | 180 | 180 |
| Xylol, parts | 72 | 72 | 72 | 72 | 72 |
| n-Butanol, parts | 48 | 48 | 48 | 48 | 48 |
| Hexamethoxymethyl melamine, parts | | | | | 54 |
| Color, Gardner | <1 | <1 | <1 | 6 | <1 |
| Viscosity, Gardner | U | O-P | H | T-U | G-H |
| Appearance | Clear | Clear | Clear | Haze | Clear |
| Non-volatile, percent | 58.0 | 58.1 | 57.5 | 60 | 66 |

TABLE III.—PERFORMANCE PROPERTIES OF WATER SOLUBLE NTA ALKYDS ON STEEL[1]

| | Example | | | | | | | | | | | | | |
|---|---|---|---|---|---|---|---|---|---|---|---|---|---|---|
| | 13B | | 14B | | 15B | | 16B | | 17B | | 18B | | 19B | 20B |
| Composition of alkyd of example | 1 | | 1 | | 2 | | 5 | | 4 | | 3 | | 7 | |
| Film thickness, mils | 0.8-1.3 | 0.2-0.4 | 0.8-1.0 | 0.9-1.2 | 0.2-0.3 | 0.9-1.2 | 0.3-0.4 | 0.9-1.2 | 0.2 | 0.9-1.3 | 0.2-0.3 | 0.6-0.7 | 0.5-0.7 |
| Impact resistance, reverse, in. lbs | >100 | >150 | >75 | >150 | >160 | >100 | >125 | >125 | >160 | >100 | >125 | >150 | >150 |
| Adhesion, cross hatch | P-100 | P-100 | P-100 | P-100 | P-100 | P-100 | P-100 | P-100 | P-100 | P-100 | P-100 | [2] 8-9+ | [2] 8+-10 |
| Fingernail mar | Good | Good | Good | Poor | Good | (3) | Good | Good | Good | Good | Good | Good | Good |
| Flexibility, 1/8 in | (4) | (4) | (4) | (4) | (4) | (4) | (4) | (4) | (4) | (4) | (4) | (4) | (4) |
| Water resistance, hrs.: | | | | | | | | | | | | | |
| Bake 25 min. at 205° C | P-3 | | F-311 | | | | | | | | F-120 | | |
| Bake 60 min. at 205° C | P-5 | | P-503 | | | | | | | | | | |
| Bake 120 min. at 205° C | P-8 | | P-503 | | P-144 | | | | | | | | |

[1] Melamine modified films baked for 30 minutes at 175° C., non-melamine modified, 25 minutes at 205° C.
[2] Knife adhesion.
[3] Slight mar.
[4] Pass.
NOTE.—F=Fail (after X hours); P=Pass (after X hours).

TABLE IV.—PERFORMANCE PROPERTIES OF SOLVENT SOLUBLE NTA ALKYDS ON STEEL[1]

| | Example | | | | |
|---|---|---|---|---|---|
| | 21B | 22B | 23B | 24B | 25B |
| Composition on alkyd of Example | 1 | 7 | 6 | 11 | 7 |
| Film thickness, mils | 0.8-0.9 | 0.3 | 0.8-1.0 | 0.9 | 1.4 | 0.8-1.0 |
| Impact resistance, reverse, in. lbs | >160 | >150 | >140 | >160 | 0 |
| Adhesion, knife | 10 | 9 | 6 | 7 | 9 |
| Fingernail mar | (2) | (2) | (2) | (3) | (2) |
| Flexibility, 1/8 in. bend | Pass | Pass | Pass | Pass | Pass-1/4 |
| Water Resistance, hrs.: | | | | | |
| Bake 25 min. at 205° C | F-84 | P-196 | [4] F-72 | | F-96 |
| Bake 60 min. at 205° C | F-120 | | F-139 | [4] F-168 | F-96 |
| Bake 120 min. at 205° C | P-196 | | F-336 | [4] F-504 | F-504 | F-422 | F-96 |
| Bake 30 min. at 235° C | | | F-264 | [4] F-504 | P-518 | F-264 |
| Bake 60 min. at 235° C | | | P-509 | | F-264 |
| Bake 60 min. at 175° C | | | | | |

[1] Melamine modified films baked for 30 minutes at 175° C, non-melamine modified, 25 minutes at 205° C.
[2] Good.
[3] Fair.
[4] Alkyd catalyzed with 0.5% lead oxide.
NOTE.—F=Fail (after X hours); P=Pass (after X hours).

It is understood that the details provided in the foregoing specification can be modified by those skilled in the art without departing from the scope of the invention.

What is claimed is:

1. A water soluble alkyd resin product having an acid number of 0 to 100 of components comprising nitrilotriacetic acid,

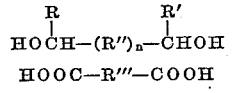

$$HOOC-R'''-COOH$$

or the corresponding diacid chloride or anhydride, and an alkaline agent, where R and R' are independently selected from the group consisting of hydrogen and a 1 to 30 carbon atom alkyl; R'' and R''' are 1 to 30 carbon atom hydrocarbylidene groups, and $n$ is a number from 0 to 3, and said alkaline agent being a member selected from the group consisting of ammonia, an aliphatic amine, and an amino aliphatic alcohol.

2. An alkyd resin according to claim 1 wherein R" and R''' are 1 to 30 carbon atom alkylidene groups.

3. An alkyd resin according to claim 1 wherein R and R' are hydrogen; and R" and R''' are independently selected 1 to 30 carbon atom alpha, omega alkylidene groups.

4. An alkyd resin according to claim 1 wherein R" is an alkeneoxymethylene substituted alkylidene, the alkene and alkylidene groups having from 1 to 30 carbon atoms.

5. An alkyd resin according to claim 1 having phthalic anhydride as an additional component.

6. An alkyd resin according to claim 1 having a defunctionalized epoxy resin as an additional component, said defunctionalized epoxy resin comprising the product of a bisphenol and epichlorohydrin epoxy resin with a fatty acid.

7. A liquid composition comprising the water soluble alkyd resin composition of claim 1 and sufficient amount of water to dissolve said composition.

8. As an article of manufacture, a metal article having as an adherent coating thereon, a cured nitrilotriacetic acid alkyd resin which comprises the reaction product having an acid number of 0 to 100 of components comprising nitrilotriacetic acid,

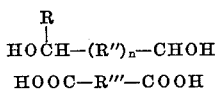

or the corresponding diacid chloride or anhydride, and an alkaline agent, wherein the alkaline agent is selected from the group consisting of ammonia, aliphatic amine, and amino aliphatic alcohol; R and R' are independently selected from the group consisting of hydrogen and a 1 to 30 carbon atom alkyl; R" and R''' are independently selected 1 to 30 carbon atom hydrocarbylidene groups; and $n$ is a number from 0.3.

9. An article according to claim 8 wherein the metal is steel.

10. A water soluble alkyd resin product having an acid number of 0 to 100 of components comprising nitrilotriacetic acid, glycerol and an alkaline agent, wherein the alkaline agent is selected from the group consisting of ammonia, an aliphatic amine, and an amino aliphatic alcohol.

11. A liquid composition comprising the water soluble alkyd resin composition of claim 10 and sufficient amount of water to dissolve said composition.

12. As an article of manufacture, a metal article having as an adherent coating thereon, a cured alkyd resin which comprises the reaction product having an acid number of 0 to 100 of components comprising nitrilotriacetic acid, glycerol and an alkaline agent, wherein the alkaline agent is selected from the group consisting of ammonia, an aliphatic amine and an amino aliphatic alcohol.

References Cited

UNITED STATES PATENTS

| | | | |
|---|---|---|---|
| 3,001,961 | 9/1961 | Armitage et al. | 260—22 |
| 3,033,826 | 5/1962 | Kibler et al. | 260—76 |
| 3,127,377 | 3/1964 | Lindenauer | 260—22 |
| 3,383,434 | 5/1968 | Carlston | 260—75 |
| 3,427,266 | 2/1969 | Phillips et al. | 260—22 |

FOREIGN PATENTS

| | | | |
|---|---|---|---|
| 842,176 | 6/1939 | France | 260—75 |

OTHER REFERENCES

Chemical Abstracts, vol. 44, No. 7, April 10, 1950, page 2911-h-2912b.

DONALD E. CZAJA, Primary Examiner

R. W. GRIFFIN, Assistant Examiner

U.S. Cl. X.R.

117—132, 161; 260—21, 29.2, 32.4, 32.6, 33.4, 75, 850